United States Patent

Benschop

[11] Patent Number: 5,923,888
[45] Date of Patent: Jul. 13, 1999

[54] MULTIPLIER FOR THE MULTIPLICATION OF AT LEAST TWO FIGURES IN AN ORIGINAL FORMAT

[76] Inventor: Nico Frits Benschop, Schoutstraat 4, 5663 EZ Geldrop, Netherlands

[21] Appl. No.: 08/990,631

[22] Filed: Dec. 15, 1997

[51] Int. Cl.[6] ........................................................ G06F 7/38
[52] U.S. Cl. ...................................... 395/750.01; 364/746
[58] Field of Search ........................ 395/750.01; 364/746, 364/746.1, 746.2, 748.5, 748.09, 748.18

[56] References Cited

U.S. PATENT DOCUMENTS

| | | | |
|---|---|---|---|
| 4,430,721 | 2/1984 | Acampora | 364/724 |
| 4,646,327 | 2/1987 | Kojima et al. | 375/60 |
| 4,782,458 | 11/1988 | Bhattacharya et al. | 364/724.16 |
| 5,031,133 | 7/1991 | Sasaki | 364/724.16 |
| 5,668,895 | 9/1997 | Yamazaki et al. | 382/260 |
| 5,828,590 | 10/1998 | Chen et al. | 364/760.01 |

*Primary Examiner*—Hassan Kizou
*Assistant Examiner*—Omar A. Omar
*Attorney, Agent, or Firm*—St. Onge Steward Johnston & Reens LLC

[57] ABSTRACT

The invention relates to a multiplier for the multiplication of at least two figures in an original format. Each of said figures is fed to a first converter for conversion of each of said figures in the product of a first binary number representing a power of 2, and a second binary number representing a signed power of 3, the exponents of the powers of 2 of the concerning figures being fed to a first adder and the exponents of the powers of 3 of the concerning figures being fed to a second adder, whereby the combined respective outputs of the first adder and the second adder represent the multiplied value of said figures, and the resulting powers of 2 and 3 as available at the outputs of the first and second adder being fed to a second converter for conversion of the multiplied value into the original format.

6 Claims, 1 Drawing Sheet

MULTIPLIER FOR THE MULTIPLICATION OF AT LEAST TWO FIGURES IN AN ORIGINAL FORMAT

BACKGROUND OF THE INVENTION

This invention relates to a multiplier for the multiplication of at least two figures in an original format.

The standard work "Computer Arithmetic" of K. Hwang, J. Wiley & Sons, NY 1979, shows the usual art of applying parallel array multipliers when multiplying digital data. Such array multipliers as shown on page 164 generally have a structure consisting of two main parts. An input part with a 2-dimensional array of n(horizontal) and n(vertical) bit-lines corresponding to the two n-bit input operands x and y. At the bitline crossings AND-gates are arranged. For arriving at the multiplied value of the input operands x and y, a processing part applies an array of about $n^2$ Full-Adders.

This known type of adder array hardware is very inefficient. The multiplication of two n-bit operands requires only one of $2^{2n}$ bit patterns being actually processed, whereas the capacity of the array is capable of adding any of the $2^{n \cdot n}n \times n$ bit patterns of $n^2$ bits.

In order to improve the efficiency of the known multiplier, the known Booth multiplier is applied as shown on page 198 of the above-mentioned citation. In the Booth multiplier, each successive bit-pair of any one operand has a value range {0, 1, 2, 3} wherein 3 is recorded as −1+4. The −1 causes a subtraction of the other operand, while +4, as positive carry into the next bit-pair position, implies an addition, resulting in an effective reduction of the logic depth in the add/subtract array, and a corresponding speed-up at the cost of a more complex recoding of one operand, and extra subtract hardware.

OBJECT OF THE INVENTION

It is the object of the invention therefore to provide a multiplier which makes use of the available hardware in a more effective way.

A further object of the invention is to provide a multiplier which is capable of providing the multiplied values of any two operands more quickly.

Still a further object of the invention is to provide a multiplier in which the required hardware is less complex.

SUMMARY OF THE INVENTION

Figure 1:
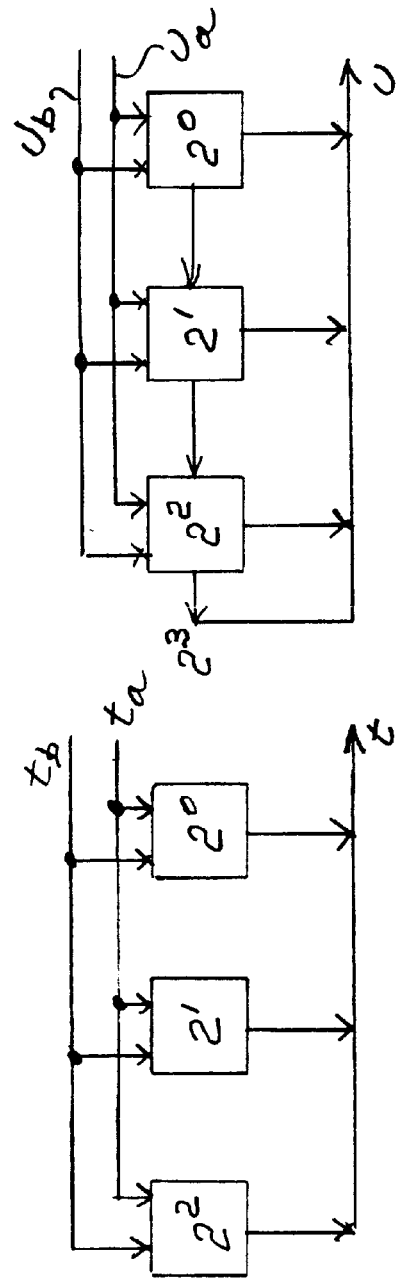
FIG. 1 is a block diagram view of a multiplier in accordance with the invention for a multiplier mod $3^2=2^5$, and with a code of $+/-3^t \times 2^u$ (where $t<2^3$, and $u \leq 5$).
Figure 1:
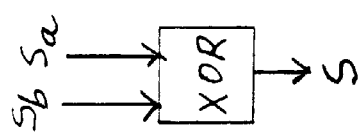
Figure 1:
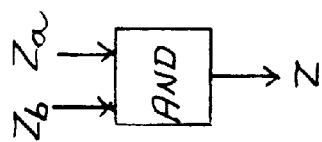

According to the invention, the multiplier for the multiplication of at least two figures in original format, for instance the known k-bit Two's Complement (TC) binary number code (with k at least 3), is arranged such that each of said figures is fed to a first converter for conversion of each of said figures in the product of a first binary number representing a power of 2, of at most k-bits, and a second binary number representing a signed power of 3, the exponents of the powers of 2 of the concerning figures being fed to a first adder and the exponents of the powers of 3 of the concerning figures being fed to a second adder, whereby the combined respective outputs of the first adder and the second adder represent the multiplied value of said figures, and the resulting powers of 2 and 3 as available at the outputs of the first and second adder being fed to a second converter for conversion of the multiplied value into the original format.

The proposed multiplier structure is based on recoding both operands, using the property that each k-bit binary coded odd number, or its complement (mod $2^k$), is the residue of a unique power $3^i$ ($i<2^{k-2}$) of 3. This results in a binary "sign magnitude" code over the two bases 2 and 3, allowing multiplication to be converted into a double addition. With the invention the multiplication of two operands which is in principle a rather complicated process, is therefore reduced to the simple addition of several numbers, in particular the exponent pairs of the binary numbers represented as the power of 2 and the signed power of 3 respectively.

In a further aspect of the invention, an operator is included for processing the sign-bits of the respective powers of 3 of the concerning figures. This can most easily be realised in the embodiment in which the operator is an XOR-port.

In still another aspect of the invention, the first converter includes a binary output, the logical value of which indicating the occurrence of the value zero in the original format. This takes care that the number zero can be represented and processed in the multiplier according to the invention.

A preferred embodiment of the multiplier is therefore characterized in that the respective binary outputs of the first converter concerning each of the figures in the original format, are fed to an AND-port, the logical output of which indicating the occurrence of the value zero of the multiplied figure in the original format.

The inventor has further found that the number 3 as basis for the conversion can be replaced by any odd power residue $3^m$ mod $2^k$ (odd m), without departing from the scope of the invention.

DESCRIPTION OF THE INVENTION

A preferred embodiment of the invention shall now be further elucidated by means of an example.

The number code used in the invention is a signed magnitude code, well suited for multiplication, and makes use of two bases, namely 2 and 3. Each k-digit binary coded residue n (mod $2^k$) is the product of a power $2^j$ of 2 ($j \leq k$), called the even part of n, and an odd residue called the odd part of n, which is the binary residue of a signed power $\pm 3^i$ of 3 with $i<2^{k-2}$. Exponent pair (i,j) and sign s uniquely encode each nonzero residue from $-(2^k-1)$ to $2^k-1$, while the zero number 0 requires j=k, which can be considered as an extra zero-bit z.

To represent all k-bit binary numbers n (integers), of which there are $2^k$, a 4-component code n=[z,s,t,u] is used, with the next interpretation:

z : one zero bit, with z=0 if n=0 and z=1 if n≠0.

s : one sign bit, with s=0 if n>0 and s=1 if n<0.

t : k−2 bits for the exponent t of odd part $3^t$.

u : e bits for the exponent u of even part $2^u$ (u<k≤$2^e$).

Extra overflow bit v=1 if $u_a+u_b \geq k$: in case a product a·b exceeds $2^{k-1}$ in magnitude.

The code of the product of two such coded numbers $a=[z_a,s_a,t_a,u_a]$ and $b=[z_b,s_b,t_b,u_b]$ is obtained by adding in binary code, by known means, the odd and even code parts t and u respectively, and adding the signs $s_a+s_b$ mod 2 (XOR), while multiplying the two zero bits $z_a \cdot z_b$ (AND). The overflow result bit v=1 if the even part overflows: $u_a+u_b \geq k$.

Using for instance the known "ripple-carry" way of binary addition hardware with a full-adder cell per bit position, the schematic diagram is as follows, where each of $t, t_a, t_b, u, u_a, u_b$ consists of 3 bits (of weights $2^0, 2^1, 2^2$) with one carryout bit $u[3]$ of weight $2^3$, and the optional overflow bit $v=u[3]+u[2]*(u[1]+u[0])$, so $v=1$ if $u \geq 5$:

Notice that in stead of 3 as base, also any odd power of 3 has the same generative property, so that $3^m$ with odd $m<2^{k-2}$ also can be used as base for the odd part in the mentioned original format conversion.

I claim:

1. A multiplier for the multiplication of at least two figures in an original format, characterized in that each of said figures is fed to a first converter for conversion of each of said figures into a product of a first binary number representing a power of 2, and a second binary number representing a signed power of 3, first and second adders, the exponents of the powers of 2 of the concerning figures being fed to the first adder and the exponents of the powers of 3 of the concerning figures being fed to the second adder, and a second converter responsive to resulting powers of 2 and 3 as available at the outputs of the first and second adder for conversion of the multiplied value into the original format.

2. The multiplier according to claim 1, whereby an operator is included for processing the sign-bits of the respective powers of 3 of the concerning figures.

3. The multiplier according to claim 2, wherein the operator is an XOR-port.

4. The multiplier according to claim 1, whereby the first converter includes a binary output, the logical value of which indicating the occurrence of the value zero in the original format.

5. The multiplier according to claim 4, wherein the respective binary outputs of the first converter concerning each of the figures in the original format, are fed to an AND-port, the logical output of which indicating the occurrence of the value zero of the multiplied figure in the original format.

6. The multiplier according to claim 1, whereby the number 3 as basis for the conversion is replaced by any odd power residue $3^m \bmod 2^k$ (odd m).

* * * * *